United States Patent [19]

Cheng et al.

[11] Patent Number: 5,447,353
[45] Date of Patent: Sep. 5, 1995

[54] AUTOMOTIVE POLARIZER SCREEN SHADE

[76] Inventors: Chi Cheng; Mickie H. Cheng, both of 391 Western Ave., Clarendon Hills, Ill. 60514

[21] Appl. No.: 214,545

[22] Filed: Mar. 18, 1994

[51] Int. Cl.$^6$ .............................................. B60J 3/06
[52] U.S. Cl. ................................. 296/97.2; 296/986; 358/493
[58] Field of Search ............... 296/97.2, 97.4, 97.5, 296/97.6, 97.9, 97.11; 359/493, 501

[56] References Cited

U.S. PATENT DOCUMENTS

| | | | |
|---|---|---|---|
| 2,526,889 | 10/1950 | McComb | 296/97.2 |
| 2,688,900 | 9/1954 | Silverman | 359/501 X |
| 2,856,810 | 10/1958 | Frost | 296/97.2 X |
| 2,894,576 | 7/1959 | Williams | 296/97.6 X |
| 3,336,073 | 8/1967 | Berger | 296/97.6 |
| 3,635,543 | 1/1972 | Collins | 359/493 X |
| 4,890,875 | 1/1990 | Takahashi | 296/97.2 |
| 4,976,486 | 12/1990 | Rifaat | 296/97.6 X |
| 5,115,341 | 5/1992 | Bentley | 359/493 |
| 5,249,078 | 9/1993 | Bentley | 296/97.6 X |

Primary Examiner—Dean Kramer

[57] ABSTRACT

An automotive polarizer screen shade with two parallel plane polarizers, one rectangular and one circular in shape, is invented. The large rectangular semi-transparent polarizer allows the driver to see most of the road clearly while the smaller circular polarizer slides and/or rotates independently to screen the direct sunlight so that the light intensity is tolerable.

6 Claims, 8 Drawing Sheets

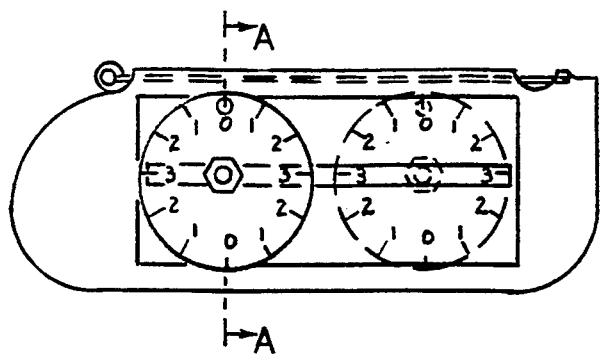 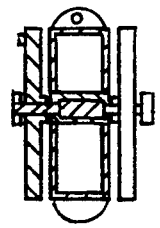
FIGURE 1D  FIGURE 1E
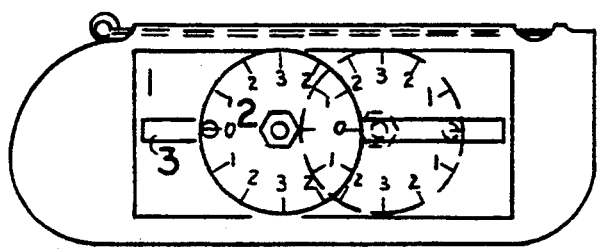
FIGURE 2B
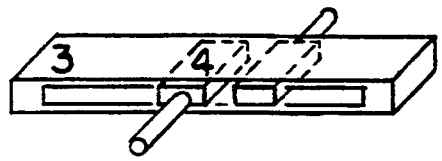
FIGURE 4C

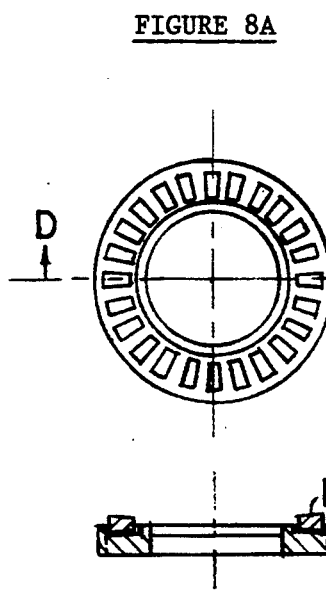
FIGURE 8A
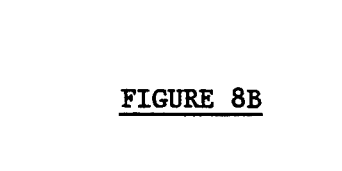
FIGURE 8B
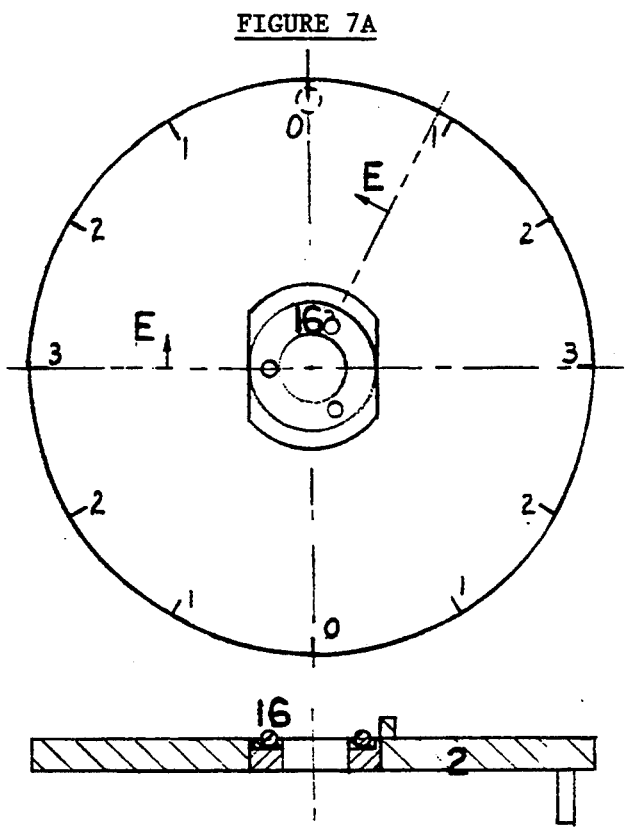
FIGURE 7A
FIGURE 7B
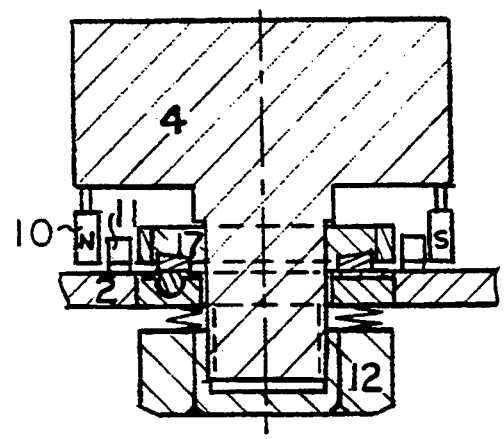
FIGURE 9

FIGURE 10
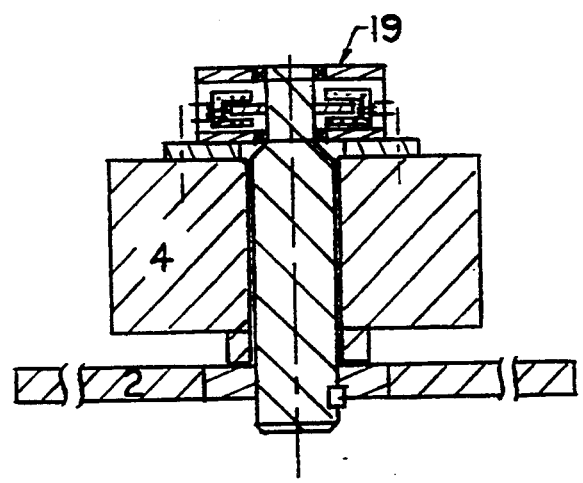
FIGURE 12  #19
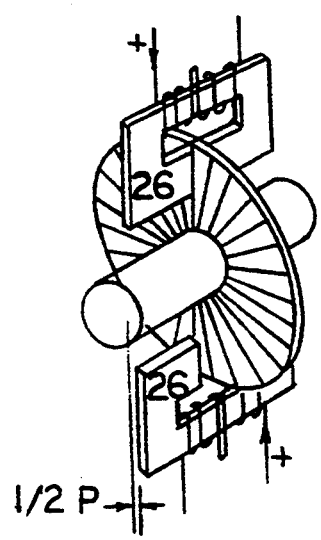

FIGURE 11 A
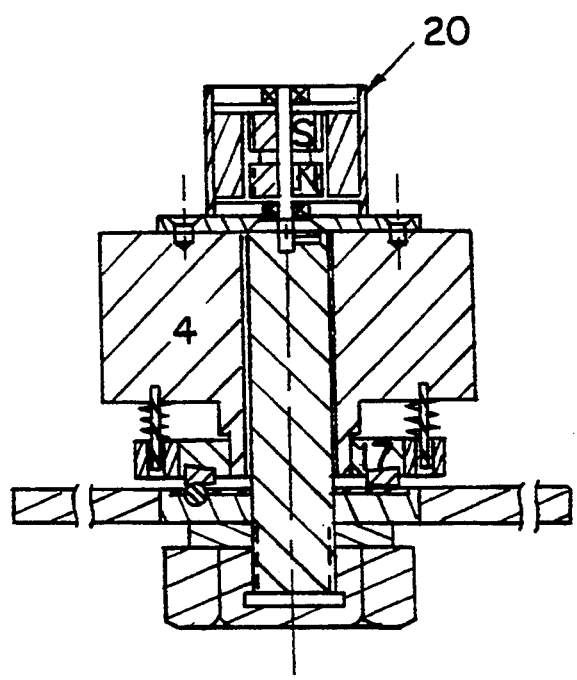
FIGURE 11B #17
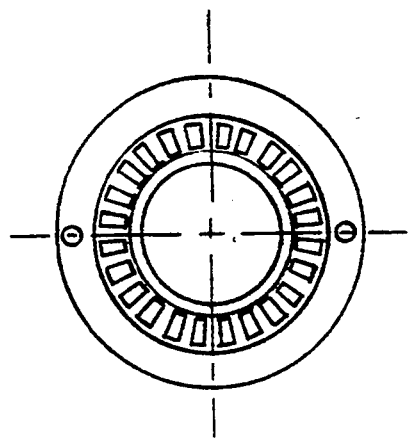

FIGURE 13
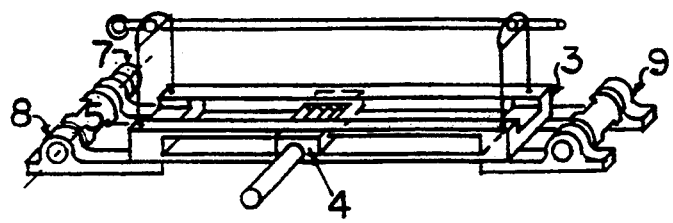
FIGURE 14A
FIGURE 14B
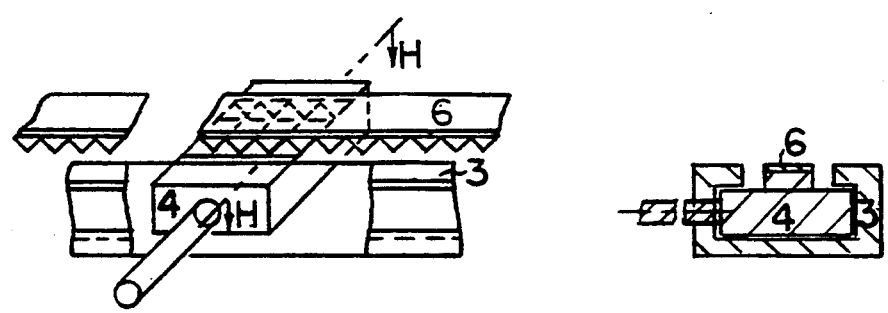
FIGURE 15
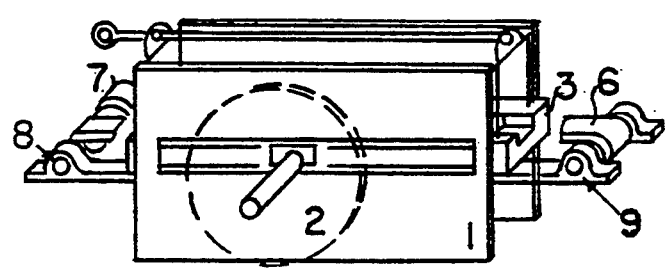

AUTOMOTIVE POLARIZER SCREEN SHADE

BACKGROUND OF THE INVENTION

It is hazardous to drive eastbound during sunrise or westbound during sunset. While you need to see the road, you see the sun right under the shade too. The shade may block the sunshine if you raise your head, but it blocks the view of the road too. You usually need sunglasses to reduce the brightness of the sunshine and to minimize the problem. But when you forget to wear your sunglasses, you may actually want to see through the shade or wish that the shade could be semitransparent, and have one particular spot darker where the sun shines brightest. This problem could be solved by inventing a semitransparent, light intensity automatically controlled car shade that allows the driver to see the road during sunrise and sunset.

1. Field of the Invention

This invention relates to the polariscope, the adjustable light transmission device, the sun visor for use in the cockpit of aircraft, and the polarizing window. Particularly, the invention provides a movable, screen darkening spot to block the sun in a curved road and a lighter, semitransparent shade for the driver to see the road.

2. Background Information

In order to provide background information so that the invention may be completely understood and appreciated in the proper context, reference may be made to a number of prior art patents and publications as follows:

In Section 1.6 of the book, 'Photoelastic Coating', by Zandman, Redner, and Dally, published by the Iowa State University Press in 1977, the plane-transmission polariscope is explained. It is the simplest light intensity control system since it consists of only two linear polarizers in parallel and a light source arranged as shown in its FIG. 1.7(a). In the polariscope, the light is first reduced by the first polarizer, and blocked totally by the second polarizer, or analyzer. This is the concept of the light intensity control device, a screen shade or a sun visor.

U.S. Pat. No. 3,521,300, Automatic Electric Self-Synchronizing Polarizing Window, to Weiss in 1970, discloses that a first polarizer is positioned solidly over a window opening of the aircraft cabin, and a second polarizer, or window, is driven to rotate by means of friction rollers at the rim.

U.S. Pat. No. 3,635,543, Variable Light Transmission Device, to Collins in 1972, discloses at least two disks of polarizers that are mounted overlapping in a housing with a rectangular polarizer to provide a variable light transmitting device. In this invention, disks can be rotated but cannot be moved linearly. To cover the whole area of car shade or variation of sunshine direction, it intends to use more than two circular disks. Constantly adjusting and rotating more than two disks on the road independently to control the sunshine may be hard to a driver. Also, this invention will use more than two disks to create overlapping areas. If the road is straight, the device will provide a screen shade after the driver pivots all disks properly.

U.S. Pat. No. 5,115,341, Sun Visor, to Bentley in 1992, discloses that one rectangular polarizer is fixed in the cockpit of an aircraft to reduce the sunlight as a visor, and a movable disk polarizer controls the sun light further. The disk has two opposed snubs as stop. These snubs are used to facilitate the rotation of the disk and the pilot can quickly adjust the visor by turning the disk, using one hand. But if it is pushed and turned by one snub, the disk will rotate and slide simultaneously. You need two hands to turn the disk evenly to prevent sliding and to push the disk evenly for linear motion to avoid rotation. If the sunshine comes in a different direction, the disk must be moved linearly with its polarization axis fixed.

Whatever the precise merits, features and advantages of the above cited references, none of them achieves or fulfills the purposes of the present invention to reduce and control the sunlight intensity at a selected, precise location. Basically, the second disk polarizer should be moved linearly to screen the sunshine directly. But the linear motion should not interfere with the polarization axis of the disk polarizer after the axis is selected independently through rotation.

SUMMARY OF THE INVENTION

This invention of the automotive screen shade using a series of polarizers will provide the semitransparent car shade and a movable polarizer disk to further reduce and control the light intensity passing through it. This screen shade utilizes the same structure and shape of a regular car shade except that it will have a rectangular hole cut in the main body and replaced by a rectangular plane polarizer plate. At the center of the plate, a slot is created for a horizontal guide. A circular shape, plane polarizer plate with a shaft at the center and a carrier block at the end of the shaft is hung parallel to the rectangular plate. This circular polarizer plate can rotate and move along the horizontal guide which acts as a track.

Note that a plane polarizer is also called a linear polarizer. A linear polarizer will block the components of a light vector vibrating in a direction transverse to the axis of the polarizer. If the rectangular polarizer plate has a horizontal axis, then sunlight that is perpendicular to the axis of polarization is blocked. Only the horizontal component parallel to the axis is transmitted. The sunshine also has reduced intensity because only its horizontal component is passing through.

However, the sunshine may still be too bright. A second circular polarizer can be moved to block or screen the sunlight further. If the axis of polarization of the circular plate is parallel to that of the rectangular plate, no further reduction of light intensity occurs. The circular plate can also be rotated independently. If the axis is inclined at an angle to the horizontal axis, further light reduction will occur. The light will be totally blocked if the axis of the circular polarizer is vertical to the horizontal axis.

Light intensity control can be achieved manually by moving the shaft of the circular polarizer and rotating the plate independently. The linear motion of the circular polarizer can also be controlled by a belt driven by a hand crank or a D-C motor through a switch to turn the electric current on, off or reverse. The rotation of the circular polarizer can also be controlled by 1.) passing electric current to coils on the extended bushing of the polarizer to create a torque between two permanent magnets, 2.) a disk type stepper motor, 3.) a variable-reluctance stepper motor, or 4.) a pin handle.

In the current designs, the naked eye of the driver is the sensor to rotate the circular polarizer to a selected index position for a preferred light intensity or darkness, and to move linearly to the position between the eyes and the sun to control the passing light intensity. In the next design in the future, the light intensity will be detected and measured by a photo sensor behind the circular polarizer. The sensor also detects the light incident angle. The light intensity dictates the rotation of the circular polarizer while the direction to minimize the light angle of incidence controls the linear sliding motion of the polarizer. The same mechanism that is used in the design with electric control by the switch and motor can also be controlled by a photo sensor and computer microchip. As the market demands, a more complex automotive polarizer screen shade will be evolved around this invention. This polarizer screen shade can also be used as a sun visor in the cockpit of aircraft and has a big advantage that the linear motion and rotation of the polarizer will not interfere with each other.

BRIEF DESCRIPTION OF THE DRAWINGS

FIGS. 1A–1E are schematic views of an automotive polarizer screen shade with an electric motor for motion control.

FIGS. 1D, 2B and 4C are the manually controlled versions of FIGS. 1A, 2A, and 4A respectively.

FIGS. 7A and 7B are the top and side views of a circular polarizer plate.

FIGS. 8A, 8B, and 11B are two versions of the index plate for rotation.

FIGS. 9, 10, and 11A are the assembly cross-sectional views of the circular polarizer plate with magnets and coils, disk type stepper motor, and variable-reluctance stepper motor respectively.

FIG. 12 is the detailed illustration of a disk type stepper motor.

FIG. 13 is the schematic drawing of the structure of the guide, carrier block, pulleys, bearings, motor, supporting wire and steering metallic rod.

FIGS. 14A and 14B the enlargement of a carrier block with the belt within the guide.

FIG. 15 is the schematic drawing of the main components of the screen shade and its structure except its rotating control system.

DETAILED DESCRIPTION

Figure 1A:
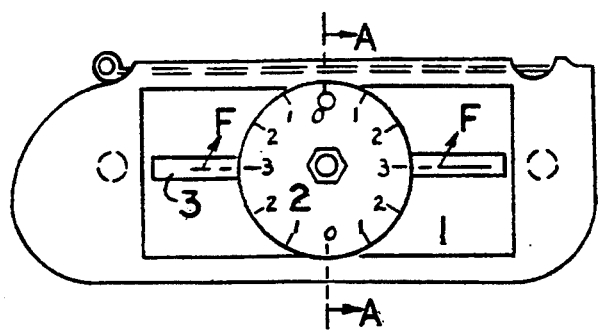
Figure 1B:
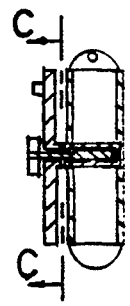

As shown in the drawings, FIGS. 1A–1E, the automotive polarizer screen shade includes a regular automotive shade frame, a series of plane (or linear) polarizer plates, a guide and a carrier block.

Figure 2A:
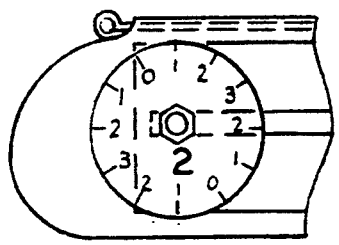
FIGS. 2A and 3 are the same shade with its circular polarizer plate located on the side locations.
Figure 3:
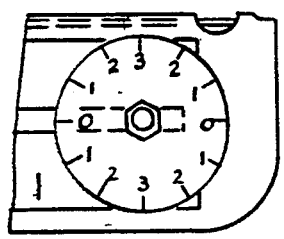
Figure 1C:
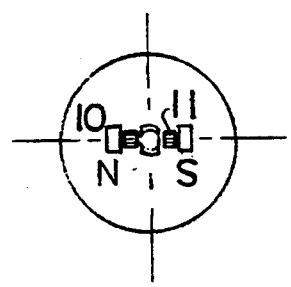
Figure 16:
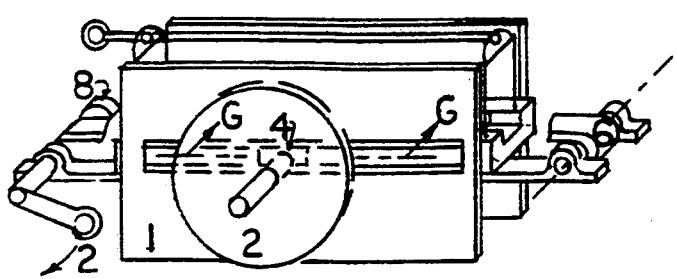
FIG. 16 is the schematic drawing of the main components of the manually controlled screen shade with a hand crank, bearings and pulleys for sliding motion of the circular polarizer.

The regular automotive shade frame consists of a steering metallic rod for the shade to turn downward or to swing sideways to block direct sunlight. The frame is enclosed in fabric with wire and cardboard supports. FIGS. 1 to 3 and figures show the configuration. FIGS. 15 and 16 show part of the wire supports for the guide. In this invention, the main body of the shade is cut to create a rectangular hole roughly 1 foot by 6 inches in size. A rectangular plane polarizer plate, #1, which is a little larger in size, is placed and embedded in the hole. In the middle section of the plate, a narrow rectangular slot is cut and a guide, #3, is inserted as a track. On the track, a tiny fit rectangular block, #4, slides, and has an extension shaft on the front side. This shaft carries a circular plane polarizer plate, #2. This circular plate has a bushing at the center and is free to rotate.

Figure 4B:
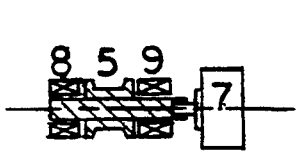
FIGS. 4A and 4B are schematic views of the guide and of the travelling system.
Figure 4A:
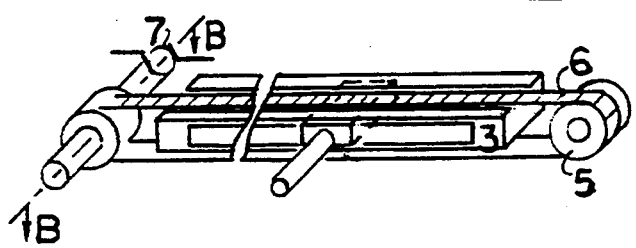

The carrier block, #4, allows the circular polarizer, #2, to move linearly with independent rotation. The linear sliding motion of the circular polarizer is necessary because the sunshine may come in at different angles. The circular polarizer can then rotate freely and turn its polarization axis to control the sunlight intensity without the interference of sliding. While FIGS. 4C and 16 show the manually controlled sliding system, FIGS. 4A, 4B, 15 and 18A–18C show the electrically controlled version.

Figure 5:
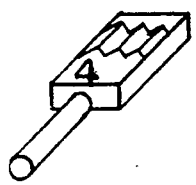
FIGS. 5 and 6 are the schematic drawings of the two versions of the carrier block with the fixed and free shaft respectively.
Figure 6:
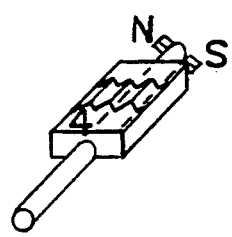

There are two versions of the carrier block, #4, due to its application. The block with a fixed shaft shown in FIG. 5 is used for manual control. It carries a circular polarizer with bushing for rotation. In the electrically controlled version, the block shown in FIG. 6 has a hole for a small long shaft to rotate. This shaft is extended out to carry a press-fit circular polarizer plate. For both versions, the carrier block has a smooth surfaces on the bottom, side, and top except the top middle, for easy sliding motion. For long, enduring application, dry lubricant such as graphite is applied on the sliding surfaces in contact.

Figure 17:
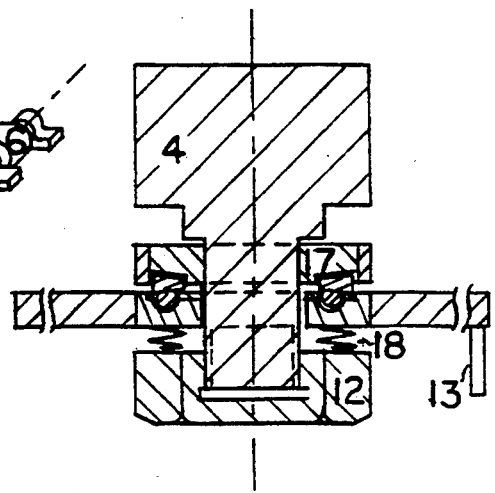
FIG. 17 is the assembly cross-sectional view of the circular polarizer with an index plate, a cap nut, spring and pin handle for manually rotational control.

In the manually controlled sliding system, the shaft of the carrier block which carries the circular polarizer can simply be pushed to the proper location by hand as shown in FIG. 4C. Two carrier blocks and two circular polarizers, one in the front and one in the back of the shade are used for convenience. For more reliable control, a belt driven system as shown in FIG. 16 will move the carrier block. The belt is wrapped around two pulleys with bearing supports and has teeth engaged in the carrier block. The driver can turn the hand crank, #21, and the belt will move the block and the circular polarizer to screen the direct sunshine further. If the axis of polarization has been selected through rotation or is at a right angle, the cap nut, #12, can then be tightened to lock the block and circular polarizer against the guide. FIG. 17 shows the locking system.

The belt and pulleys can also be turned by a D-C or stepper motor. The turning direction of the motor, clockwise or counter-clockwise, is controlled by an electric on-off-reverse switch which supplies or reverses the current. FIGS. 4A, 4B, 15 and 18A–18C show this linear motion driving system.

Figure 19:
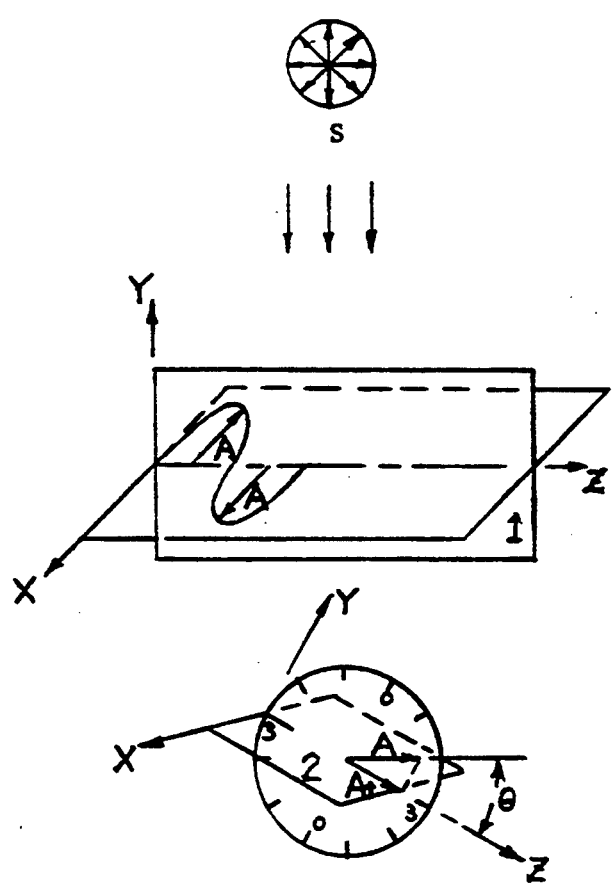
FIG. 19 is the schematic drawing of the sunlight passing through the rectangular and circular linear polarizer plates.

With the above system to control the linear motion of the circular polarizer, there are always two parallel polarizers to screen the sun light. As shown in FIG. 19, the unpolarized sunlight passes the rectangular plane polarizer plate, #1, and only the light component which is parallel to the axis of polarization is transmitted. This light component is then screened by the circular plane polarizer plate again. Its component, $A_t$, in the direction of the polarization axis of the circular polarizer, is transmitted. The magnitude of the light intensity, $|A_t|$, is reduce to $A \cdot \cos \theta$.

It will be easier to control the light intensity, $A \cdot \cos \theta$, if the plate has its axis of polarization indexed. FIG. 7A shows the circular polarizer with axis-indexing numbers, 0 to 3. Number 3 is marked at the radius which is parallel to the axis of polarization of the circular plate. Number 0 is at the radius which is perpendicular to the axis of polarization. On one side of its bushing, there are three bearing balls located at 120 degrees apart. For the step angle control in rotation, an index plate with 24 rollers is designed. Each bearing ball, #16, sits on top of two rollers, #14, of the index plate, #17, for step motion control. These 24 rollers provide seven different index angles, from 0, 15, ... to 90 degrees, for the control of angle, $\theta$, and light intensity. FIGS. 8A and 11B are two versions of the index plate for two different assemblies, which are shown in FIGS. 9 and 11A respectively.

With the application of the index plate as shown in FIG. 17, the driver can turn the circular polarizer with its pin handle, #13. The torque from the pin handle moves the balls to roll over the rollers of the index plate step by step. The compressed spring between the bushing of the circular polarizer and the lock nut provides the resistant force. Together they create a 15 degree stepping rotation. The rotation control of tile circular polarizer can also be achieved through an electro-magnetic torque. FIG. 9 shows the cross-section view of the circular polarizer with N-S magnets pinned to the carrier block and coils, #11, attached to the bushing of the circular polarizer. An on-off-reverse switch provides or reverses the current to the coil and creates a torque to turn the circular polarizer. Similarly, this torque and stepping rotation can be achieved through the application of stepper motor, either disk type or variable-reluctance. FIGS. 10 and 11 show the assemblies with these motors for rotation control. FIG. 12 illustrates a disk type stepper motor, #19, containing two armature poles, one for each phase. The motor is half-stepped at an angle of 15 degrees in rotation, and is synchronized to the index plate with 24 rollers.

Figures 18B, 18C:
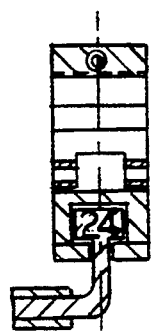
FIGS. 18A–18G show the application of the polarizer screen shade as a sun visor in the cockpit of an aircraft.
Figure 18:
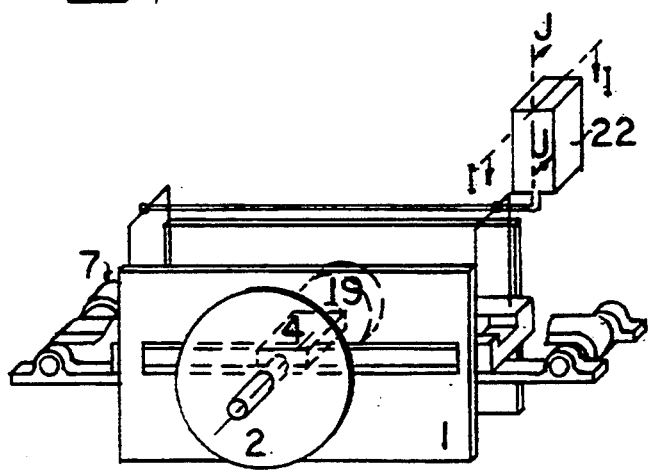

Similarly, the same automotive polarizer screen shade can be used as a sun visor in the cockpit of the aircraft. The only modification of the previous designs is its fastening system to the cockpit as shown in FIGS. 18A and 18C. The steering metallic rod of the shade can swing with its cylindrical head inside the block, #2. The upper portion of the block is a clamping device with a butterfly hinge. The shade will be clamped and attached to the cockpit where a conventional sun visor is hung. The ideal place will be in the middle of the left quadrant or in the middle of the right quadrant. When the pilot swings the rod, the shade can cover half of the cockpit even if the sunshine comes from the front or the side.

For the convenience in manufacturing the parts, these materials are suggested:

The polarizer is sheet polarizer material made of polymeric plastic which is embedded in optical transparent plastic or glass plates.

Stainless steel or Aluminum-Titanium alloy is preferred and used in structural parts such as the guide, #3, and the carrier block, #4.

Steel is used in the index plate, #17, rollers, the bushing of polarizer, bearing balls, spring, bearing supports, shaft and cap nut. The belt, #6, is made of polyurethane elastomer. Pulleys are made of plastic such as nylon and polycarbonate with or without fiberglass reinforcement.

With the application of the carrier block and guide, the automotive screen shade has the linear motion of the circular polarizer fully controlled, either manually or electrically. With the application of an index plate and/or stepper motor, the circular polarizer rotates at a step angle and the shade has full control to screen the sunshine. Safety will be enhanced because only a small portion of the field of vision is obscure.

Although preferred designs of the invention has been illustrated and described herein, this invention is intended to encompass any rearrangements, modification and substitution of the parts and elements as fall within the spirit of the appended claims.

What is claimed is:

1. An automotive polarizer screen shade comprising
   a rectangular semi-transparent linear polarizer, (1), with a narrow rectangular slot at its middle section;
   a rectangular metallic or plastic hollow block, (3) at the middle slot of the rectangular polarizer, serving as a guide and consisting of an internal slot for the sliding motion of another smaller block;
   a small rectangular block, (4), with an extended freely rotating through shaft, serving as a carrying block for a circular linear polarizer;
   a circular polarizer, (2) being carried by the shaft at its front end with a bushing at its center and a spring controlled clamped nut in front on the shaft;
   two electric coils, (11), being attached at the back end of the shaft at 180 degrees apart with wires leading to an on-off-reverse three-way electric switch;
   two N-S magnets, (10) being attached at the back of the carrier block, (4), beside each of the electric coils; a loop timing belt, (6), wrapping around the top of the carrier block and two sets of pulleys, (5), with bearings, (8-9); and
   a D-C motor, (7) being mounted on one of said pulley shafts with electrical wires leading to another on-off-reverse three-way electric switch.

2. The automotive polarizer screen shade in claim 1, wherein said circular linear polarizer (2), with its rotating shaft is turned by a pure torque from said electric coils-magnets (11-10) galvanometer turning device without creating any unwanted side thrust force to interfere with the linear motion and position of said circular linear polarizer.

3. The automotive polarizer screen shade in claim 1, wherein said carrier block (4) is moved linearly and controlled by the turning of said D-C motor (7) and timing belt (6), and wherein said circular linear polarizer (2) is carried by the block (4) to the desired linear position without its angular polarization index being changed.

4. The automotive polarizer screen shade in claims 2 or 3, wherein said linear motion of said carrier block (4) and of said circular linear polarizer (2) and said rotation of said circular linear polarizer (2) are controlled independently and simultaneously without interference to and from each other.

5. The automotive polarizer screen shade in claim 1, wherein said electric coils-magnets turning device can be alternatively replaced with a stepper motor, either disc type (19) or variable-reluctance type (20).

6. The automotive polarizer screen shade in claim 1, wherein said rectangular linear polarizer can have additional components for its swinging motion, which include a clamping, swinging block and an enclosed cylindrical swing head, and wherein said screen shade can be used as sun visor with the same advantage of said independent and simultaneous linear and rotational motions of said carrier block and said circular linear polarizer without interference to and from each other.

* * * * *